US012761033B2

(12) United States Patent
Chen et al.

(10) Patent No.: US 12,761,033 B2
(45) Date of Patent: Oct. 13, 2026

(54) DISTANCE PREDICTION METHOD, MODEL TRAINING METHOD, PLANNING-CONTROL SYSTEM AND RELATED APPARATUSES

(71) Applicant: Momenta (Suzhou) Technology Co., Ltd., Jiangsu (CN)

(72) Inventors: Liang Chen, Jiangsu (CN); Jun Li, Jiangsu (CN); Chi Zhang, Jiangsu (CN)

(73) Assignee: Momenta (Suzhou) Technology Co., Ltd., Jiangsu (CN)

( * ) Notice: Subject to any disclaimer, the term of this patent is extended or adjusted under 35 U.S.C. 154(b) by 45 days.

(21) Appl. No.: 18/960,058

(22) Filed: Nov. 26, 2024

(65) Prior Publication Data

US 2025/0085125 A1 Mar. 13, 2025

Related U.S. Application Data

(63) Continuation of application No. PCT/CN2023/095192, filed on May 19, 2023.

(30) Foreign Application Priority Data

Apr. 23, 2023 (CN) ........................ 202310442772.X

(51) Int. Cl.
*G01C 21/34* (2006.01)
*G06T 7/50* (2017.01)
*G06T 7/73* (2017.01)

(52) U.S. Cl.
CPC ..... *G01C 21/3476* (2013.01); *G01C 21/3407* (2013.01); *G06T 7/50* (2017.01);
(Continued)

(58) Field of Classification Search
CPC ............ G01C 21/3476; G01C 21/3407; G01C 21/3804; G01C 21/3602; G01C 21/3461;
(Continued)

(56) References Cited

U.S. PATENT DOCUMENTS

2011/0282573 A1* 11/2011 Ting .................... G01C 21/3688
711/E12.001
2018/0010920 A1* 1/2018 Poppen .............. G01C 21/3476
(Continued)

FOREIGN PATENT DOCUMENTS

CN 113074729 A 7/2021
CN 113978484 A 1/2022
(Continued)

OTHER PUBLICATIONS

Extended European Search Report for Application No. 23934699.2, Sep. 16, 2025, pp. 1-16.
(Continued)

*Primary Examiner* — Anne Marie Antonucci
*Assistant Examiner* — Luis G Del Valle
(74) *Attorney, Agent, or Firm* — Quarles & Brady LLP

(57) ABSTRACT

The present application discloses a distance prediction method, a model training method, a planning-control system and related apparatuses thereof. The distance prediction method includes: acquiring a first global pose, a first expanded navigation path and first landmark information of a first vehicle, where the first global pose is a global pose of the first vehicle at a current moment, the first expanded navigation path includes an expanded path of a first vehicle navigation path determined based on the first global pose, and the first landmark information includes landmark information included in a first road environment image collected by the first vehicle at the first global pose; processing the first global pose, the first expanded navigation path and the first landmark information based on a distance prediction model to obtain a farthest reachable distance on each lane in the first landmark information.

17 Claims, 4 Drawing Sheets

(52) U.S. Cl.
CPC ...... *G06T 7/73* (2017.01); *G06T 2207/20081* (2013.01); *G06T 2207/30241* (2013.01); *G06T 2207/30256* (2013.01)

(58) Field of Classification Search
CPC .. G01C 21/3446; G01C 21/3492; G06T 7/50; G06T 7/73; G06T 2207/20081; G06T 2207/30241; G06T 2207/30256; G06N 3/045; G06N 3/08
See application file for complete search history.

(56) References Cited

U.S. PATENT DOCUMENTS

| | | | | |
|---|---|---|---|---|
| 2020/0225044 | A1 | 7/2020 | Tohriyama et al. | |
| 2022/0364874 | A1 | 11/2022 | Jung et al. | |
| 2023/0169863 | A1 * | 6/2023 | Tseng .................... | B60W 50/14 340/436 |

FOREIGN PATENT DOCUMENTS

| | | | |
|---|---|---|---|
| CN | 115200588 | A | 10/2022 |
| CN | 115235499 | A | 10/2022 |
| CN | 115237121 | A | 10/2022 |
| CN | 115523934 | A | 12/2022 |
| JP | H1079100 | A | 3/1998 |
| JP | 2012226563 | A | 11/2012 |
| JP | 2013127754 | A | 6/2013 |
| JP | 2018118672 | A | 8/2018 |
| JP | 2019064562 | A | 4/2019 |
| WO | 2022080214 | A1 | 4/2022 |

OTHER PUBLICATIONS

Japan Notice of Reasons for Refusal for App No. 2024 to 569655, Dec. 4, 2025, pp. 1-8.
International Search Report and Written Opinion for International Application No. PCT/CN2023/095192 filed on May 19, 2023.

* cited by examiner

DISTANCE PREDICTION METHOD, MODEL TRAINING METHOD, PLANNING-CONTROL SYSTEM AND RELATED APPARATUSES

CROSS-REFERENCE TO RELATED APPLICATION

This application is a continuation of International Application No. PCT/CN2023/095192 filed on May 19, 2023, which claims priority to Chinese Patent Application No. 202310442772.X, filed to China National Intellectual Property Administration on Apr. 23, 2023. The afore-mentioned patent applications are hereby incorporated by reference in their entireties.

TECHNICAL FIELD

The present application relates to the field of intelligent driving technology and, in particular, to a distance prediction method, a model training method, a planning-control system and related apparatuses thereof.

BACKGROUND

An intelligent driving system is a complex system with a combination of hardware and software, and the system includes a plurality of modules such as sensor integration, environment perception, prediction and planning-control. As an important support of the intelligent driving system, a high-precision map can provide more accurate and detailed information compared to a traditional navigation map, thereby realizing the commercial application of intelligent driving technology. For example, in a planning-control process, the intelligent driving system can carry out path planning based on the high-precision map to determine whether its vehicle will continue to move forward based on the current lane or change lanes. However, the collection and production of the high-precision map are very complicated. In order to ensure the "freshness" of the high-precision map so as to meet the safe use requirements of intelligent driving, the high-precision map needs to be updated frequently, which involves huge data collection workload, and requires a lot of time, manpower and material resources. Therefore, the economic cost and time cost of the planning-control based on the high-precision map are relatively high.

SUMMARY

The present application provides a distance prediction method, a model training method, a planning-control system and related apparatuses thereof, which can solve the problem of high economic cost and time cost required for planning-control based on a high precision map.

Specific technical solutions are as follows.

In a first aspect, an embodiment of the present application provides a distance prediction method, including:

acquiring a first global pose, a first expanded navigation path and first landmark information of a first vehicle, where the first global pose is a global pose of the first vehicle at a current moment, the first expanded navigation path includes an expanded path of a first vehicle navigation path determined based on the first global pose, and the first landmark information includes landmark information included in a first road environment image collected by the first vehicle at the first global pose;

processing the first global pose, the first expanded navigation path and the first landmark information based on a distance prediction model to obtain a farthest reachable distance on each lane in the first landmark information;

where a training method for the distance prediction model includes:

acquiring a distance training sample set, where each training sample in the distance training sample set includes: a second expanded navigation path, second landmark information, a second global pose and a truth value of a farthest reachable distance, where the second expanded navigation path includes an expanded path of a second vehicle navigation path, the second landmark information includes landmark information included in a second road environment image collected by a second vehicle on the second expanded navigation path, the second global pose includes a global pose of the second vehicle when collecting the second road environment image, and the truth value of the farthest reachable distance includes a truth value of a farthest reachable distance of each lane in the second landmark information;

performing training by using the distance training sample set to obtain the distance prediction model.

According to the above solution, in the embodiment of the present application, the distance prediction model can be obtained at first by training according to the distance training sample set including the second expanded navigation path, the second landmark information, the second global pose and the true value of the farthest reachable distance of each lane in the second landmark information. Then the first global pose, the first expanded navigation path and the first landmark information are input into the distance prediction model, and the farthest reachable distance on each lane in the first landmark information is predicted. Since the second global pose, the second expanded navigation path and the second landmark information required in model training, as well as the first global pose, the first expanded navigation path and the first landmark information required in model application, do not rely on the high precision map, in the embodiment of the present application, the distance prediction model that can predict the furthest reachable distance of the vehicle on each lane ahead of the vehicle can be automatically trained without frequently updating the high precision map, and the distance prediction model can be used to automatically predict the furthest reachable distance of the vehicle on each lane ahead of the vehicle, so as to quickly perform path planning according to the furthest reachable distance of the vehicle on each lane ahead of the vehicle. In this way, the planning-control in intelligent driving can be realized under the condition of saving the economic cost and time cost.

In a first possible implementation of the first aspect, in a case that a target expanded navigation path includes the first expanded navigation path and/or the second expanded navigation path, a method for acquiring the target expanded navigation path includes:

acquiring a target vehicle navigation path and a target global pose of a target vehicle travelling on the target vehicle navigation path, where, when the target expanded navigation path is the first expanded navigation path, the target vehicle navigation path is the first vehicle navigation path, the target vehicle is the first vehicle, and the target global pose is the first global pose; when the target expanded navigation path is the second expanded navigation path, the target vehicle navigation path is the second vehicle navigation path, and the target global pose is the second global pose;

extracting POI (Point of Interest, Point of Interest) information corresponding to the target global pose from target data, where the target data includes navigation events and/or a vehicle navigation map, the POI information includes road attribute information related to predicting the farthest reachable distance, and the POI information corresponding to the target global pose includes POI information within a preset distance range in front of the target global pose on the target vehicle navigation path;

adding the POI information to the target vehicle navigation path to obtain the target expanded navigation path.

According to the above solution, in the embodiment of the present application, the POI information corresponding to the second global pose can be extracted from the navigation events and/or the vehicle navigation map, and the extracted POI information can be added to the second vehicle navigation path to obtain the second expanded navigation path which is more conducive to training a high-quality distance prediction model than the second vehicle navigation path. In the embodiment of the present application, the POI information corresponding to the first global pose can also be extracted from the navigation events and/or the vehicle navigation map, and the extracted POI information can be added to the first vehicle navigation path to obtain the first expanded navigation path which is more conducive to predicting the farthest reachable distance than the first vehicle navigation path. In addition, the first expanded navigation path and the second expanded navigation path can be acquired only based on the navigation events and/or the vehicle navigation map, without relying on the high precision map.

In a second possible implementation of the first aspect, in a case that target landmark information includes the first landmark information and/or the second landmark information, a method for acquiring the target landmark information included in a target road environment image collected by a target vehicle at a target moment includes:

acquiring input data of a landmark perception model, where the input data includes the target road environment image at the target moment and a target local pose at the target moment, where the target local pose includes an offset of a global pose of the target vehicle when collecting the target road environment image relative to a global pose at a target starting point, and the target moment is any moment when the target vehicle collects the target road environment image on a target expanded navigation path; when the target landmark information is the first landmark information, the target vehicle is the first vehicle, the target road environment image is the first road environment image, the target expanded navigation path is the first expanded navigation path, and the target local pose is a first local pose; when the target landmark information is the second landmark information, the target vehicle is the second vehicle, the target road environment image is the second road environment image, the target expanded navigation path is the second expanded navigation path, and the target local pose is a second local pose;

processing the input data based on the landmark perception model to obtain the target landmark information included in the target road environment image at the target moment.

According to the above solution, in the embodiment of the present application, not only can the target landmark information contained in the target road environment image at any moment be automatically perceived based on the pre-trained landmark perception model, but also the input data of the landmark perception model includes only the target road environment image and the target local pose and has nothing to do with the high precision map, thus the target landmark information can be obtained without the high precision map.

In a third possible implementation of the first aspect, in a case that the target moment is a moment when the target road environment image is collected for an Nth time on the target expanded navigation path, the input data further includes an output result of the landmark perception model for a previous moment adjacent to the target moment, where the output result of the previous moment includes target landmark information included in a target road environment image collected at the previous moment, and N is a positive integer greater than or equal to 2.

According to the above solution, in the case that the target moment is not a moment when the target road environment image is collected for the first time on the target expanded navigation path, the output result of the landmark perception model for the previous moment can be used as one piece of the input data of the landmark perception model corresponding to the target moment in the embodiment of the present application, so that the perception accuracy of the landmark perception model can be improved.

In a fourth possible implementation of the first aspect, a method for generating the landmark perception model includes:

acquiring a landmark training sample set, where each training sample in the landmark training sample set includes: a road environment sample image group, a third local pose corresponding to each frame of road environment sample image in the road environment sample image group, and a landmark truth value corresponding to each frame of road environment sample image, where the road environment sample image group includes multiple frames of continuous road environment sample images;

performing training by using the landmark training sample set to obtain the landmark perception model, where the landmark perception model is used to perceive and output landmark information in a road environment sample image.

According to the above solution, since the landmark perception model is trained based on multiple road environment sample image groups, in a process of machine learning, when performing landmark information perception on each frame of road environment sample image, adjacent frames (either one adjacent frame or multiple adjacent frames) before and after in the road environment sample image group will be referred to. Therefore, when performing landmark perception on a single frame of road environment image based on the landmark perception model, invisible landmark information in the road environment image can be perceived, including landmark information that is not contained or cannot be clearly displayed in the current image, such as landmark information outside a detection range of a sensor, landmark information that is blocked, landmark information that cannot be clearly displayed due to poor image quality (night, dazzling scenes, etc.), so as to achieve a perceptual effect of being invisible but obtainable. Moreover, the acquisition of the third local pose and the landmark truth value in the landmark training sample set do not rely on the high precision map, so that the distance prediction model that can perceive the landmark information in the road environment sample image can be automatically trained without frequently updating the high precision map.

In a fifth possible implementation of the first aspect, a method for acquiring the landmark truth value includes:

for each road environment sample image group to be processed, acquiring drive-test time series data corresponding to the road environment sample image group according to the third local pose of each frame of road environment sample image in the road environment sample image group;

building a first local map based on the drive-test time series data;

acquiring the landmark truth value of each frame of road environment sample image by projecting the first local map separately into each frame of road environment sample image in the road environment sample image group.

According to the above solution, in the embodiment of the present application, the first local map can be built based on the drive-test time series data corresponding to the road environment sample image group, and the landmark truth value of each frame of road environment sample image can be obtained by projecting the first local map into the road environment sample image. In this way, the invisible landmark information in the road environment sample image can be automatically annotated on the premise of not relying on the high precision map, which provides a technical basis for the landmark perception model to have a technical effect of being invisible but obtainable.

In a sixth possible implementation of the first aspect, a method for acquiring the truth value of the farthest reachable distance includes:

generating a second local map including the second expanded navigation path based on a continuous video stream, and travelling according to the second expanded navigation path in the second local map;

calculating the farthest reachable distance on each lane ahead of each second global pose on the second expanded navigation path separately based on the second local map;

taking a calculated farthest reachable distance as a truth value, and annotating corresponding second landmark information with the truth value to obtain the truth value of the farthest reachable distance of each lane in the second landmark information.

According to the above solution, in the embodiment of the present application, truth value annotation of the farthest reachable distance in the second landmark information can be realized according to the second local map that is generated based on the continuous video stream and contains the second expanded navigation path and according to the second expanded navigation path, which does not require human involvement, so that the efficiency of the truth value annotation of the farthest reachable distance can be improved.

In a second aspect, an embodiment of the present application provides a training method for a distance prediction model, including:

acquiring a distance training sample set, where each training sample in the distance training sample set includes: a second expanded navigation path, second landmark information, a second global pose and a truth value of a farthest reachable distance, where the second expanded navigation path includes an expanded path of a second vehicle navigation path, the second landmark information includes landmark information included in a second road environment image collected by a second vehicle on the second expanded navigation path, and the second global pose includes a global pose of the second vehicle when collecting the second road environment image;

performing training by using the distance training sample set to obtain the distance prediction model, where the distance prediction model is used to predict a farthest reachable distance of any vehicle on each lane ahead of the vehicle.

According to the above solution, in the embodiment of the present application, the distance prediction model can be obtained by training according to the distance training sample set including the second expanded navigation path, the second landmark information, the second global pose and the true value of the farthest reachable distance of each lane in the second landmark information. Obviously, the acquisition of these sample information does not rely on the high precision map. In this way, the distance prediction model that can predict the furthest reachable distance of the vehicle on each lane ahead of the vehicle can be automatically trained without frequently updating the high precision map, and the distance prediction model can be used to automatically predict the furthest reachable distance of the vehicle on each lane ahead of the vehicle, so as to quickly perform path planning according to the furthest reachable distance of the vehicle on each lane ahead of the vehicle. In this way, the planning-control in intelligent driving can be realized under the condition of saving the economic cost and time cost.

In a first possible implementation of the second aspect, a method for acquiring the second expanded navigation path includes:

acquiring the second vehicle navigation path and the second global pose of the second vehicle when travelling on the second vehicle navigation path;

extracting point of interest (POI) information corresponding to the second global pose from target data, where the target data includes navigation events and/or a vehicle navigation map, the POI information includes road attribute information related to predicting the farthest reachable distance, and the POI information corresponding to the second global pose includes POI information within a preset distance range in front of the second global pose on the second vehicle navigation path;

adding the POI information to the second vehicle navigation path to obtain the second expanded navigation path.

According to the above solution, in the embodiment of the present application, the POI information corresponding to the second global pose can be extracted from the navigation events and/or the vehicle navigation map, and the extracted POI information can be added to the second vehicle navigation path to obtain the second expanded navigation path which is more conducive to training a high-quality distance prediction model than the second vehicle navigation path. Therefore, the second expanded navigation path can be acquired only based on the navigation events and/or the vehicle navigation maps, without relying on the high precision map.

In a second possible implementation of the second aspect, a method for acquiring the second landmark information included in the second road environment image collected by the second vehicle at a target moment includes:

acquiring input data of a landmark perception model, where the input data includes the second road environment image at the target moment and a second local pose at the target moment, where the second local pose includes an offset of a global pose of the second vehicle when collecting the second road environment image relative to a global pose at a target starting point, and the target moment is any moment when the second vehicle collects the second road environment image on the second expanded navigation path;

processing the input data based on the landmark perception model to obtain the second landmark information included in the second road environment image at the target moment.

According to the above solution, in the embodiment of the present application, not only can the second landmark information contained in the second road environment image at any moment be automatically perceived based on the pre-trained landmark perception model, but also the input data of the landmark perception model includes only the second road environment image and the second local pose and has nothing to do with the high precision map, thus the second landmark information can be obtained without the high precision map.

In a third possible implementation of the second aspect, in a case that the target moment is a moment when the second road environment image is collected for an Nth time on the second expanded navigation path, the input data further includes an output result of the landmark perception model for a previous moment adjacent to the target moment, where the output result of the previous moment includes second landmark information included in a second road environment image collected at the previous moment, and N is a positive integer greater than or equal to 2.

According to the above solution, in the case that the target moment is not a moment when the second road environment image is collected for the first time on the second expanded navigation path, the output result of the landmark perception model for the previous moment can be used as one piece of the input data of the landmark perception model corresponding to the target moment in the embodiment of the present application, so that the perception accuracy of the landmark perception model can be improved.

In a fourth possible implementation of the second aspect, a method for generating the landmark perception model includes:

acquiring a landmark training sample set, where each training sample in the landmark training sample set includes: a road environment sample image group, a third local pose corresponding to each frame of road environment sample image in the road environment sample image group, and a landmark truth value corresponding to each frame of road environment sample image, where the road environment sample image group includes multiple frames of continuous road environment sample images;

performing training by using the landmark training sample set to obtain the landmark perception model, where the landmark perception model is used to perceive and output landmark information in a road environment sample image.

According to the above solution, since the landmark perception model is trained based on multiple road environment sample image groups, in a process of machine learning, when performing landmark information perception on each frame of road environment sample image, adjacent frames (either one adjacent frame or multiple adjacent frames) before and after in the road environment sample image group will be referred to. Therefore, when performing landmark perception on a single frame of road environment image based on the landmark perception model, invisible landmark information in the road environment image can be perceived, including landmark information that is not contained or cannot be clearly displayed in the current image, such as landmark information outside a detection range of a sensor, landmark information that is blocked, landmark information that cannot be clearly displayed due to poor image quality (night, dazzling scenes, etc.), so as to achieve a perceptual effect of being invisible but obtainable. Moreover, the acquisition of the third local pose and the landmark truth value in the landmark training sample set do not rely on the high precision map, so that the distance prediction model that can perceive the landmark information in the road environment sample image can be automatically trained without frequently updating the high precision map.

In a fifth possible implementation of the second aspect, a method for acquiring the landmark truth value includes:

for each road environment sample image group to be processed, acquiring drive-test time series data corresponding to the road environment sample image group according to the third local pose of each frame of road environment sample image in the road environment sample image group;

building a first local map based on the drive-test time series data;

acquiring the landmark truth value of each frame of road environment sample image by projecting the first local map separately into each frame of road environment sample image in the road environment sample image group.

According to the above solution, in the embodiment of the present application, the first local map can be built based on the drive-test time series data corresponding to the road environment sample image group, and the landmark truth value of each frame of road environment sample image can be obtained by projecting the first local map into the road environment sample image. In this way, the invisible landmark information in the road environment sample image can be automatically annotated on the premise of not relying on the high precision map, which provides a technical basis for the landmark perception model to have a technical effect of being invisible but obtainable.

In a sixth possible implementation of the second aspect, a method for acquiring the truth value of the farthest reachable distance includes:

generating a second local map including the second expanded navigation path based on a continuous video stream, and travelling according to the second expanded navigation path in the second local map;

calculating the farthest reachable distance on each lane ahead of each second global pose on the second expanded navigation path separately based on the second local map;

taking a calculated farthest reachable distance as a truth value, and annotating corresponding second landmark information with the truth value to obtain the truth value of the farthest reachable distance of each lane in the second landmark information.

According to the above solution, in the embodiment of the present application, truth value annotation of the farthest reachable distance in the second landmark information can be realized according to the second local map that is generated based on the continuous video stream and contains the second expanded navigation path and according to the second expanded navigation path, which does not require human involvement, so that the efficiency of the truth value annotation of the farthest reachable distance can be improved.

In a third aspect, an embodiment of the present application provides a vehicle planning-control system, where the system includes: a positioning module, a path expanding module, a perception module, a distance prediction module and a planning-control module;

the positioning module is configured to acquire a first global pose and a first local pose of a first vehicle, where the first local pose includes an offset of a global pose of the first vehicle when collecting a first road environment image relative to a global pose at a target starting point;

the path expanding module is configured to determine a first expanded navigation path based on the first global pose, where the first expanded navigation path includes an expanded path of a first vehicle navigation path;

the perception module is configured to perceive first landmark information and target object information around the first vehicle, where the first landmark information includes landmark information included in the first road environment image collected by the first vehicle at the first global pose, and the target object information includes at least one of traffic light information in front of the first vehicle, static object information around the first vehicle, dynamic object information around the first vehicle;

the distance prediction module is configured to acquire a farthest reachable distance on each lane in the first landmark information based on the method described in any of the implementations of the first aspect;

the planning-control module is configured to determine a planned trajectory of the first vehicle according to user expectation information, the farthest reachable distance on each lane in the first landmark information, the first local pose and the target object information, and control the first vehicle to travel based on the planned trajectory.

According to the above solution, it can be seen that the planning-control system provided by the embodiment of the present application, which includes the positioning module, the path expanding module, the perception module, the distance prediction module and the planning-control module, can not only automatically predict the farthest reachable distance on each lane in the first landmark information by using the distance prediction model that does not rely on the high precision map and is automatically trained, but also determine a planned trajectory of the first vehicle according to the user expectation information, the farthest reachable distance on each lane in the first landmark information, the first local pose and the target object information, and control the first vehicle to travel based on the planned trajectory, so that the planning-control in intelligent driving can be realized under the condition of saving the economic cost and time cost. Moreover, a decoupling design is adopted for global positioning and local positioning, that is, when each module performs data processing, only one of positioning results of the global positioning and the local positioning is needed, and there is no impact on each other. In addition, the decline of the global positioning accuracy will not affect the local positioning, so results of real-time perception and planning-control will not be affected, and incorrect emergency braking will not be caused.

In a first possible implementation of the third aspect, the path expanding module is configured to: acquire the first global pose and the first vehicle navigation path determined based on the first global pose; extract point of interest (POI) information corresponding to the first global pose from target data, where the target data includes navigation events and/or a vehicle navigation map, the POI information includes road attribute information related to predicting the farthest reachable distance, and the POI information corresponding to the first global pose includes POI information within a preset distance range in front of the first global pose on the first vehicle navigation path; add the POI information to the first vehicle navigation path to obtain the first expanded navigation path.

In a second possible implementation of the third aspect, the perception module is configured to: acquire input data of a landmark perception model, where the input data includes the first road environment image at a target moment and the first local pose at the target moment, and the target moment is any moment when the first vehicle collects the first road environment image on the first expanded navigation path; process the input data based on the landmark perception model to obtain the first landmark information included in the first road environment image at the target moment.

In a third possible implementation of the third aspect, in a case that the target moment is a moment when the first road environment image is collected for an Nth time on the first expanded navigation path, the input data acquired by the perception module further includes an output result of the landmark perception model for a previous moment adjacent to the target moment, where the output result of the previous moment includes first landmark information included in a first road environment image collected at the previous moment, and N is a positive integer greater than or equal to 2.

In a fourth aspect, an embodiment of the present application provides a distance prediction apparatus, including:

an acquisition unit, configured to acquire a first global pose, a first expanded navigation path and first landmark information of a first vehicle, where the first global pose is a global pose of the first vehicle at a current moment, the first expanded navigation path includes an expanded path of a first vehicle navigation path determined based on the first global pose, and the first landmark information includes landmark information included in a first road environment image collected by the first vehicle at the first global pose;

a distance prediction unit, configured to process the first global pose, the first expanded navigation path and the first landmark information based on a distance prediction model to obtain a farthest reachable distance on each lane in the first landmark information;

the acquisition unit is further configured to acquire a distance training sample set before the first global pose, the first expanded navigation path and the first landmark information are processed based on the distance prediction model, where each training sample in the distance training sample set includes: a second expanded navigation path, second landmark information, a second global pose and a truth value of a farthest reachable distance, where the second expanded navigation path includes an expanded path of a second vehicle navigation path, the second landmark information includes landmark information included in a second road environment image collected by a second vehicle on the second expanded navigation path, the second global pose includes a global pose of the second vehicle when collecting the second road environment image, and the truth value of the farthest reachable distance includes a truth value of a farthest reachable distance of each lane in the second landmark information;

the apparatus further includes:

a training unit, configured to perform training by using the distance training sample set to obtain the distance prediction model.

In a first possible implementation of the fourth aspect, the acquisition unit includes:

a first acquisition module, configured to acquire a target vehicle navigation path and a target global pose of a target vehicle travelling on the target vehicle navigation path in a case that a target expanded navigation path includes the first expanded navigation path and/or the second expanded navigation path, where, when the target expanded navigation path is the first expanded navigation path, the target vehicle navigation path is the first vehicle navigation path, the target vehicle is the first vehicle, and the target global pose is the first global pose; when the target expanded navigation path is the second expanded navigation path, the target vehicle navigation path is the second vehicle navigation path, and the target global pose is the second global pose;

an extraction module, configured to extract point of interest (POI) information corresponding to the target global pose from target data, where the target data includes navigation events and/or a vehicle navigation map, the POI information includes road attribute information related to predicting the farthest reachable distance, and the POI information corresponding to the target global pose includes POI information within a preset distance range in front of the target global pose on the target vehicle navigation path;

an adding module, configured to add the POI information to the target vehicle navigation path to obtain the target expanded navigation path.

In a second possible implementation of the fourth aspect, the acquisition unit includes:

a second acquisition module, configured to acquire input data of a landmark perception model in a case that target landmark information includes the first landmark information and/or the second landmark information, where the input data includes the target road environment image at the target moment and a target local pose at the target moment, where the target local pose includes an offset of a global pose of the target vehicle when collecting the target road environment image relative to a global pose at a target starting point, and the target moment is any moment when the target vehicle collects the target road environment image on a target expanded navigation path; when the target landmark information is the first landmark information, the target vehicle is the first vehicle, the target road environment image is the first road environment image, the target expanded navigation path is the first expanded navigation path, and the target local pose is a first local pose; when the target landmark information is the second landmark information, the target vehicle is the second vehicle, the target road environment image is the second road environment image, the target expanded navigation path is the second expanded navigation path, and the target local pose is a second local pose;

a processing module, configured to process the input data based on the landmark perception model to obtain the target landmark information included in the target road environment image at the target moment.

In a third possible implementation of the fourth aspect, in a case that the target moment is a moment when the target road environment image is collected for an Nth time on the target expanded navigation path, the input data further includes an output result of the landmark perception model for a previous moment adjacent to the target moment, where the output result of the previous moment includes target landmark information included in a target road environment image collected at the previous moment, and N is a positive integer greater than or equal to 2.

In a fourth possible implementation of the fourth aspect, the acquisition unit further includes:

a first generation module, configured to generate the landmark perception model before the processing module processes the input data based on the landmark perception model to obtain the target landmark information included in the target road environment image at the target moment;

where the first generation module includes:

an acquisition submodule, configured to acquire a landmark training sample set, where each training sample in the landmark training sample set includes: a road environment sample image group, a third local pose corresponding to each frame of road environment sample image in the road environment sample image group, and a landmark truth value corresponding to each frame of road environment sample image, where the road environment sample image group includes multiple frames of continuous road environment sample images;

a training submodule, configured to perform training by using the landmark training sample set to obtain the landmark perception model, where the landmark perception model is used to perceive and output landmark information in a road environment sample image.

In a fifth possible implementation of the fourth aspect, the acquisition submodule is configured to: for each road environment sample image group to be processed, acquire drive-test time series data corresponding to the road environment sample image group according to the third local pose of each frame of road environment sample image in the road environment sample image group; build a first local map based on the drive-test time series data; acquire the landmark truth value of each frame of road environment sample image by projecting the first local map separately into each frame of road environment sample image in the road environment sample image group.

In a sixth possible implementation of the fourth aspect, the acquisition unit includes:

a second generation module, configured to generate a second local map including the second expanded navigation path based on a continuous video stream;

a travelling module, configured to travel according to the second expanded navigation path in the second local map;

a calculating module, configured to calculate the farthest reachable distance on each lane ahead of each second global pose on the second expanded navigation path separately based on the second local map;

a truth value annotation module, configured to take a calculated farthest reachable distance as a truth value, and annotate corresponding second landmark information with the truth value to obtain the truth value of the farthest reachable distance of each lane in the second landmark information.

According to the above solution, in the embodiment of the present application, the distance prediction model can be obtained at first by training according to the distance training sample set including the second expanded navigation path, the second landmark information, the second global pose and the true value of the farthest reachable distance of each lane in the second landmark information. Then the first global pose, the first expanded navigation path and the first landmark information are input into the distance prediction model, and the farthest reachable distance on each lane in the first landmark information is predicted. Since the second global pose, the second expanded navigation path and the second landmark information required in model training, as well as the first global pose, the first expanded navigation path and the first landmark information required in model application, do not rely on the high precision map, in the embodiment of the present application, the distance prediction model that can predict the furthest reachable distance of the vehicle on each lane ahead of the vehicle can be automatically trained without frequently updating the high precision map, and the distance prediction model can be used to automatically predict the furthest reachable distance of the vehicle on each lane ahead of the vehicle, so as to quickly perform path planning according to the furthest reachable distance of the vehicle on each lane ahead of the vehicle. In this way, the planning-control in intelligent driving can be realized under the condition of saving the economic cost and time cost.

In a fifth aspect, an embodiment of the present application provides a training apparatus for a distance prediction model, including:

- an acquisition unit, configured to acquire a distance training sample set, where each training sample in the distance training sample set includes: a second expanded navigation path, second landmark information, a second global pose and a truth value of a farthest reachable distance, where the second expanded navigation path includes an expanded path of a second vehicle navigation path, the second landmark information includes landmark information included in a second road environment image collected by a second vehicle on the second expanded navigation path, and the second global pose includes a global pose of the second vehicle when collecting the second road environment image;
- a training unit, configured to perform training by using the distance training sample set to obtain the distance prediction model, where the distance prediction model is used to predict a farthest reachable distance of any vehicle on each lane ahead of the vehicle.

In a first possible implementation of the fifth aspect, the acquisition unit includes:

- a first acquisition module, configured to acquire the second vehicle navigation path and the second global pose of the second vehicle when travelling on the second vehicle navigation path;
- an extraction module, configured to extract point of interest (POI) information corresponding to the second global pose from target data, where the target data includes navigation events and/or a vehicle navigation map, the POI information includes road attribute information related to predicting the farthest reachable distance, and the POI information corresponding to the second global pose includes POI information within a preset distance range in front of the second global pose on the second vehicle navigation path;
- an adding module, configured to add the POI information to the second vehicle navigation path to obtain the second expanded navigation path.

In a second possible implementation of the fifth aspect, the acquisition unit includes:

- a second acquisition module, configured to acquire input data of a landmark perception model, where the input data includes the second road environment image at a target moment and a second local pose at the target moment, where the second local pose includes an offset of a global pose of the second vehicle when collecting the second road environment image relative to a global pose at a target starting point, and the target moment is any moment when the second vehicle collects the second road environment image on the second expanded navigation path;
- a processing module, configured to process the input data based on the landmark perception model to obtain the second landmark information included in the second road environment image at the target moment.

In a third possible implementation of the fifth aspect, in a case that the target moment is a moment when the second road environment image is collected for an Nth time on the second expanded navigation path, the input data further includes an output result of the landmark perception model for a previous moment adjacent to the target moment, where the output result of the previous moment includes second landmark information included in a second road environment image collected at the previous moment, and N is a positive integer greater than or equal to 2.

In a fourth possible implementation of the fifth aspect, the acquisition unit further includes:

- a first generation module, configured to generate the landmark perception model before the input data is processed based on the landmark perception model to obtain the second landmark information included in the second road environment image at the target moment;

the first generation module includes:

- an acquisition submodule, configured to acquire a landmark training sample set, where each training sample in the landmark training sample set includes: a road environment sample image group, a third local pose corresponding to each frame of road environment sample image in the road environment sample image group, and a landmark truth value corresponding to each frame of road environment sample image, where the road environment sample image group includes multiple frames of continuous road environment sample images;
- a training submodule, configured to perform training by using the landmark training sample set to obtain the landmark perception model, where the landmark perception model is used to perceive and output landmark information in a road environment sample image.

In a fifth possible implementation of the fifth aspect, the acquisition submodule is configured to: for each road environment sample image group to be processed, acquire drive-test time series data corresponding to the road environment sample image group according to the third local pose of each frame of road environment sample image in the road environment sample image group; build a first local map based on the drive-test time series data; acquire the landmark truth value of each frame of road environment sample image by projecting the first local map separately into each frame of road environment sample image in the road environment sample image group.

In a sixth possible implementation of the fifth aspect, the acquisition unit includes:

a second generation module, configured to generate a second local map including the second expanded navigation path based on a continuous video stream;

a travelling module, configured to travel according to the second expanded navigation path in the second local map;

a calculating module, configured to calculate the farthest reachable distance on each lane ahead of each second global pose on the second expanded navigation path separately based on the second local map;

a truth value annotation module, configured to take a calculated farthest reachable distance as a truth value, and annotate corresponding second landmark information with the truth value to obtain the truth value of the farthest reachable distance of each lane in the second landmark information.

According to the above solution, in the embodiment of the present application, the distance prediction model can be obtained by training according to the distance training sample set including the second expanded navigation path, the second landmark information, the second global pose and the true value of the farthest reachable distance of each lane in the second landmark information. Obviously, the acquisition of these sample information does not rely on the high precision map. In this way, the distance prediction model that can predict the furthest reachable distance of the vehicle on each lane ahead of the vehicle can be automatically trained without frequently updating the high precision map, and the distance prediction model can be used to automatically predict the furthest reachable distance of the vehicle on each lane ahead of the vehicle, so as to quickly perform path planning according to the furthest reachable distance of the vehicle on each lane ahead of the vehicle. In this way, the planning-control in intelligent driving can be realized under the condition of saving the economic cost and time cost.

In a sixth aspect, an embodiment of the present application provides a computer-readable storage medium on which a computer program is stored, and when the program is executed by a processor, the method described in any of the possible implementations of the first aspect or any of the possible implementations of the second aspect is implemented.

In a seventh aspect, an embodiment of the present application provides an electronic device, where the electronic device includes:

one or more processors;

the processors are coupled with a storage apparatus, and the storage apparatus is used for storing one or more programs;

when the one or more programs are executed by the one or more processors, the electronic device is caused to implement the method described in any of the possible implementations of the first aspect or any of the possible implementations of the second aspect.

In an eighth aspect, an embodiment of the present application provides a vehicle, where the vehicle includes the system described in any of the possible implementations of the third aspect, or the apparatus described in any of the possible implementations of the fourth aspect or in any of the possible implementations of the fifth aspect, or the electronic device described in the seventh aspect.

In a ninth aspect, an embodiment of the present application provides a computer program product, where the computer program product contains instructions, and when the instructions run on a computer or processor, the computer or processor is caused to execute the method described in any of the possible implementations of the first aspect or any of the possible implementations of the second aspect.

BRIEF DESCRIPTION OF DRAWINGS

In order to illustrate technical solutions in embodiments of the present application or in the prior art more clearly, a brief description of the drawings required to be used in the description of the embodiments or the prior art is presented below. It is obvious that the drawings in the description below are only some embodiments of the present application. For persons of ordinary skill in the art, other drawings can also be acquired according to these drawings without any creative effort.

DESCRIPTION OF EMBODIMENTS

The technical solutions in embodiments of the present application will be described in combination with the accompanying drawings of the embodiments of the present application clearly and comprehensively. Obviously, the described embodiments are merely some of the embodiments of the present application, rather than all of them. Based on the embodiments in the present application, all other embodiments obtained by persons of ordinary skill in the art without creative effort belong to the protection scope of the present application.

It should be noted that the embodiments of the present application and the features in the embodiments may be combined with each other in the absence of conflict. The terms “including” and “having” in the embodiments of the present application and the accompanying drawings, and any variations thereof, are intended to cover non-exclusive inclusions. For example, processes, methods, systems, products or devices including a series of steps or units are not limited to the listed steps or units, but optionally also include steps or units not listed, or optionally include other steps or units inherent to these processes, methods, products or devices.

Figure 1:
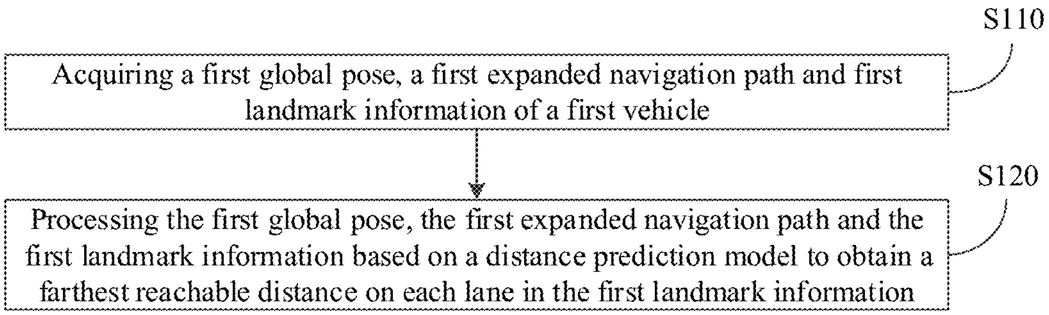
FIG. 1 is a flow diagram of a distance prediction method provided by an embodiment of the present application.

FIG. 1 is a flow diagram of a distance prediction method. The method can be applied to an electronic device or a computer device, and specifically to a vehicle or a server. Specifically, the method can include the following steps.

S110: acquiring a first global pose, a first expanded navigation path and first landmark information of a first vehicle.

The first global pose is a global pose of the first vehicle at the current moment, the first expanded navigation path includes an expanded path of a first vehicle navigation path determined based on the first global pose, and the first landmark information includes landmark information included in a first road environment image collected by the first vehicle at the first global pose.

A pose includes a vehicle position and a vehicle attitude. A global pose includes a vehicle position and a vehicle attitude based on global positioning. When acquiring the global pose, high-precision positioning such as RTK (Real-time kinematic, carrier phase difference technology) is not required, and only road-level positioning, such as navigation positioning, is needed. The global positioning can use the earth as a reference system for positioning, that is, the coordinate system of the global positioning can be the geodetic coordinate system.

When a user enters a starting point (which may also be the default current position) and an end point in a vehicle navigation software, the vehicle navigation software will generate the first vehicle navigation path according to the starting point and the end point, and a navigation positioning system will locate the first global pose of the first vehicle in real time. The vehicle navigation software may be a software on the vehicle or a software on a mobile terminal that communicates with the vehicle. Therefore, the vehicle navigation path may be a path generated by the vehicle navigation software on the vehicle or a path generated by the vehicle navigation software on the mobile terminal that communicates with the vehicle. The source of the vehicle navigation path is not limited in the embodiment of the present application.

For a specific method for acquiring the first expanded navigation path and the first landmark information, a method for acquiring a target expanded navigation path and target landmark information in the following can be referred to, which will not be repeated here.

S120: processing the first global pose, the first expanded navigation path and the first landmark information based on a distance prediction model to obtain a farthest reachable distance on each lane in the first landmark information.

Figure 2:
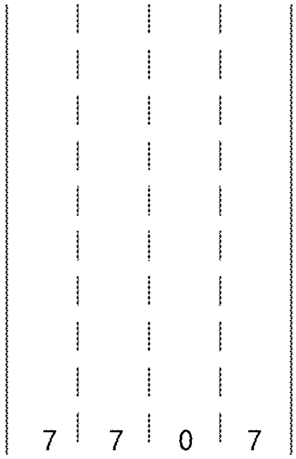
FIG. 2 is an example diagram of a farthest reachable distance in landmark information provided by an embodiment of the present application.

After the first global pose, the first expanded navigation path and the first landmark information are obtained, the first global pose, the first expanded navigation path and the first landmark information can be input into the pre-trained distance prediction model for calculation, to obtain the farthest reachable distance on each lane in the first landmark information, which is output from the distance prediction model. The farthest reachable distance acquired on each lane in the first landmark information can be expressed by an actual distance, such as 2000 meters, or by a symbol that has a mapping relationship with the actual distance, for example, 0 means 0 meters, 1 means (0, 200] meters, 2 means (200, 400] meters, 3 means (400, 600] meters, 4 means (600, meters, 5 means (800, 1000] meters, 6 means (1000, 2000] meters, and 7 means more than 2000 meters. As shown in FIG. 2, there are 4 lanes in the first landmark information, and the farthest reachable distance from left to right is 7, 7, 0, and 7 respectively, so there are 3 lanes available for travelling.

After the farthest reachable distance on each lane in the first landmark information is obtained, the farthest reachable distance on each lane in the first landmark information, user expectation information, a first local pose, and target object information around the first vehicle can be input into a planning-control module to acquire a planning-control result, such as whether to change lanes, when to change lanes, whether to accelerate/decelerate, when to accelerate/decelerate, a future planning path trajectory, and so on. The user expectation information includes the user's operation on the vehicle, such as shifting the lever to change lanes, turning on a lane change light, stepping on the brake, etc. The target object information includes at least one of traffic light information in front of the first vehicle, static object information around the first vehicle, dynamic object information around the first vehicle, such as surrounding vehicles, pedestrians, obstacles, traffic lights, etc. When the farthest reachable distance on the current lane of the vehicle is getting smaller and smaller, the planning-control module can determine whether to change lanes and when to change lanes in combination with the user expectation information, the first local pose and the target object information.

Using the distance prediction method of the embodiment of the present application, the distance prediction model can be obtained at first by training according to the distance training sample set including the second expanded navigation path, the second landmark information, the second global pose and the true value of the farthest reachable distance of each lane in the second landmark information. Then the first global pose, the first expanded navigation path and the first landmark information are input into the distance prediction model, and the farthest reachable distance on each lane in the first landmark information is predicted. Since the second global pose, the second expanded navigation path and the second landmark information required in model training, as well as the first global pose, the first expanded navigation path and the first landmark information required in model application, do not rely on the high precision map, in the embodiment of the present application, the distance prediction model that can predict the furthest reachable distance of the vehicle on each lane ahead of the vehicle can be automatically trained without frequently updating the high precision map, and the distance prediction model can be used to automatically predict the furthest reachable distance of the vehicle on each lane ahead of the vehicle, so as to quickly perform path planning according to the furthest reachable distance of the vehicle on each lane ahead of the vehicle. In this way, the planning-control in intelligent driving can be realized under the condition of saving the economic cost and time cost.

Figure 3:
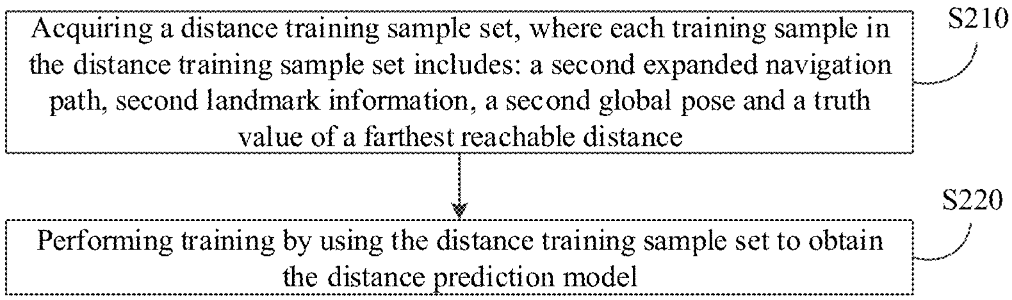
FIG. 3 is a flow diagram of a training method for a distance prediction model provided by an embodiment of the present application.

FIG. 3 is a flow diagram of a training method for a distance prediction model. The method can be applied to an electronic device or a computer device, and specifically to a vehicle or a server. Specifically, the method can include the following steps.

S210: acquiring a distance training sample set, where each training sample in the distance training sample set includes: a second expanded navigation path, second landmark information, a second global pose and a truth value of a farthest reachable distance.

The second expanded navigation path includes an expanded path of a second vehicle navigation path; the second landmark information includes landmark information included in a second road environment image collected by a second vehicle on the second expanded navigation path; the second global pose includes a global pose of the second vehicle when collecting the second road environment image;

and the truth value of the farthest reachable distance includes a truth value of a farthest reachable distance of each lane in the second landmark information. For a specific method for acquiring the second expanded navigation path and the second landmark information, a method for acquiring a target expanded navigation path and target landmark information in the following can be referred to, which will not be repeated here. A navigation positioning system will locate the second global pose of the second vehicle in real time.

A method for acquiring the truth value of the farthest reachable distance is described as follows.

The truth value of the farthest reachable distance can be annotated manually or automatically. An automatic annotation method can include: generating a second local map including the second expanded navigation path based on a continuous video stream, and travelling according to the second expanded navigation path in the second local map; calculating the farthest reachable distance on each lane ahead of each second global pose on the second expanded navigation path separately based on the second local map; taking a calculated farthest reachable distance as a truth value, and annotating corresponding second landmark information with the truth value to obtain the truth value of the farthest reachable distance of each lane in the second landmark information.

The continuous video stream may be generated by an image collector, a dashcam and/or other devices of the second vehicle, as long as it is possible to record a video stream of road environment information in front of or around the second vehicle while it is travelling. In addition to a literal meaning of being continuous, "continuous" here can also include that a total number of frames of the video stream collected in a predetermined period of time exceeds a preset value.

It should be added that the farthest reachable distance can be the farthest reachable distance within a certain distance range, and the distance range is usually greater than a distance range contained in the road environment image. For example, when the road environment image has a range of 100 meters, a distance range limited by the farthest reachable distance can be within 2 kilometers in range.

S220: performing training by using the distance training sample set to obtain the distance prediction model.

The distance prediction model is used to predict the farthest reachable distance of the vehicle on each lane ahead of the vehicle. In the embodiment of the present application, the distance prediction model can be acquired through multiple iterations of training. After each iteration of training is performed based on the distance training sample set and a distance prediction model obtained from this iteration of training is acquired, at least one frame of second road environment image is processed based on the distance prediction model obtained from this iteration of training, to obtain a predicted value of the farthest reachable distance of each frame of second road environment image in the at least one frame of second road environment image, and a loss value is calculated based on a difference between the predicted value of the farthest reachable distance and a corresponding true value of the farthest reachable distance. When the loss value is greater than a second loss threshold, the iterative training is continued, and the training is not stopped until the loss value is less than or equal to the second loss threshold. The distance prediction model obtained from the final training is taken as the final required distance prediction model.

It should be noted that the first vehicle may be a vehicle used in the training of the distance prediction model, or may not participate in the training of the distance prediction model, so the first vehicle may be the second vehicle or not the second vehicle. The number of the second vehicles participating in the training of the distance prediction model may be one or multiple.

For the first road environment image and the second road environment image, if a distance prediction model is obtained after convergence of the training based on the second road environment image for the first time, and information in the first road environment image is processed by using the distance prediction model, then the second road environment image is collected earlier than the first road environment image, that is, compared with the first road environment image, the second road environment image belongs to historical road environment images. If a distance prediction model is obtained after convergence of the training based on a batch of second road environment images for the first time, and in order to further improve the quality of the distance prediction model, another batch of second road environment images including road scenes to be supplemented are collected to continue training the distance prediction model, then the collection time of the second road environment images used to continue training the distance prediction model may be later than that of the first road environment image, that is, compared with the first road environment image, the second road environment images may not belong to the historical road environment images.

Accordingly, compared with the first global pose, the second global pose may belong to historical global poses or may not belong to the historical global poses; compared with the first expanded navigation path, the second expanded navigation path may belong to historical expanded navigation paths or may not belong to the historical expanded navigation paths; compared with the first landmark information, the second landmark information may belong to historical landmark information, or may not belong to the historical landmark information.

Using the training method for the distance prediction model provided in the embodiment of the present application, the distance prediction model is obtained by training according to the distance training sample set including the second expanded navigation path, the second landmark information, the second global pose and the true value of the farthest reachable distance of each lane in the second landmark information. Obviously, the acquisition of these sample information does not rely on the high precision map. In this way, the distance prediction model that can predict the furthest reachable distance of the vehicle on each lane ahead of the vehicle can be automatically trained without frequently updating the high precision map, and the distance prediction model can be used to automatically predict the furthest reachable distance of the vehicle on each lane ahead of the vehicle, so as to quickly perform path planning according to the furthest reachable distance of the vehicle on each lane ahead of the vehicle. In this way, the planning-control in intelligent driving can be realized under the condition of saving the economic cost and time cost.

In an implementation, when a target expanded navigation path includes the first expanded navigation path and/or the second expanded navigation path, a method for acquiring the target expanded navigation path is described as follows.

When a user inputs a starting point (which may also be the default current position) and an end point in a vehicle navigation software, the vehicle navigation software will generate at least one target vehicle navigation path according to the starting point and the end point. The target vehicle navigation path includes a road name, a road type and road geometry (formed by a set of global positioning points). In order to facilitate the distance prediction model to accurately predict the farthest reachable distance of each lane, some auxiliary information can be added to the target vehicle navigation path for the distance prediction model to perform prediction.

The electronic device or computer device can first acquire a target vehicle navigation path and a target global pose of the vehicle when travelling on the target vehicle navigation path, then extract POI information corresponding to the target global pose from target data, and finally, add the POI information to the target vehicle navigation path to obtain the target expanded navigation path.

The target data includes navigation events and/or a vehicle navigation map. A navigation event is an event announced in the vehicle navigation system, for example, be about to enter a ramp 1 km ahead, there is an entering point 1 km ahead, there is a fork in the front, please take the left fork, be about to enter a tunnel in the front, etc. The POI information includes road attribute information related to predicting the farthest reachable distance, such as the number of lanes, entering and exiting points, speed limit information, long solid lines, etc. The POI information corresponding to the target global pose is POI information within a preset distance range in front of the target global pose on the target vehicle navigation path. The preset distance range is greater than or equal to path length contained in the target road environment image collected by the vehicle at the target global pose.

Figure 4:
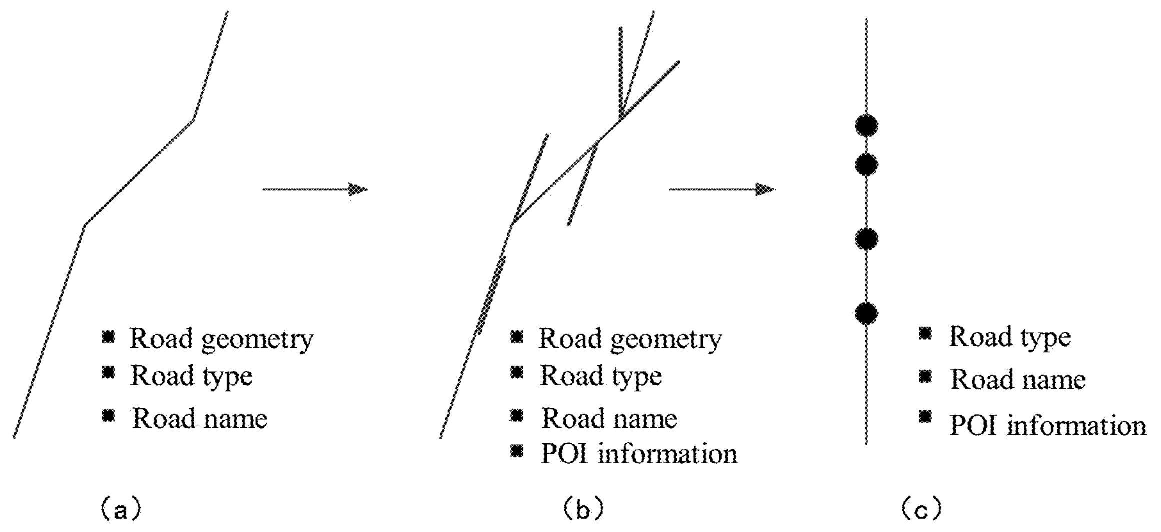
FIG. 4 is an example diagram of a vehicle navigation path and an expanded navigation path provided by an embodiment of the present application.

As shown in FIG. 4, (a) is the vehicle navigation path, including basic information such as road geometry, a road type and a road name, and (b) is the expanded navigation path after adding POI information to (a). In order to save storage space, the road geometry can also be removed, and simple lines and attribute identification graphics can be retained. Specifically, as shown in (c), a road can be represented by a straight line, entering and exiting lines can be represented by dots at corresponding positions, and corresponding attribute information can be given to the dots.

It should be noted that when the target expanded navigation path is the first expanded navigation path, the target vehicle navigation path is the first vehicle navigation path, the target vehicle is the first vehicle, and the target global pose is the first global pose. When the target expanded navigation path is the second expanded navigation path, the target vehicle navigation path is the second vehicle navigation path, and the target global pose is the second global pose.

In the embodiment of the present application, the POI information corresponding to the second global pose can be extracted from the navigation events and/or the vehicle navigation map, and the extracted POI information can be added to the second vehicle navigation path to obtain the second expanded navigation path which is more conducive to training a high-quality distance prediction model than the second vehicle navigation path. In the embodiment of the present application, the POI information corresponding to the first global pose can also be extracted from the navigation events and/or the vehicle navigation map, and the extracted POI information can be added to the first vehicle navigation path to obtain the first expanded navigation path which is more conducive to predicting the farthest reachable distance than the first vehicle navigation path. In addition, the first expanded navigation path and the second expanded navigation path can be acquired only based on the navigation events and/or the vehicle navigation map, without relying on the high precision map.

In an implementation, when target landmark information includes the first landmark information and/or the second landmark information, a method for acquiring the target landmark information is described as follows.

The target landmark information acquired from the target road environment image is not marked in the target road environment image, but extracted from the target road environment image, and the obtained target landmark information is the landmark information that retains the geometry and the relative position relationship between respective landmarks, a display effect of which is similar to a simple map.

A method for acquiring the target landmark information included in the target road environment image collected by the vehicle at the target moment includes: acquiring input data of a landmark perception model, where the input data includes the target road environment image at the target moment and a target local pose at the target moment, where the target local pose includes an offset of a global pose of the target vehicle when collecting the target road environment image relative to a global pose at a target starting point, and the target moment is any moment when the target vehicle collects the target road environment image on the target expanded navigation path; processing the input data based on the landmark perception model to obtain the target landmark information included in the target road environment image at the target moment.

A coordinate system where the local pose is located may be a boot (boot) coordinate system. In the boot coordinate system, a point at which the vehicle is powered on is the origin of the coordinate system, so the coordinate system is also called a power-on coordinate system. In addition, the local pose can also be positioned based on the navigation positioning system, without the need for high precision positioning. The target starting point may be any specified position, for example, the position of the target vehicle when it is powered on, or any specified position in a travelling process of the target vehicle.

When an acquisition cycle of the image collector collecting the target road environment image is different from a positioning cycle of the navigation positioning system, for example, if the target road environment image is collected at the target moment but positioning is not performed at the target moment, then a target local pose of the latest positioning moment can be taken as the target local pose of the target moment. However, the order of magnitude of the acquisition cycle and the positioning cycle is relatively small, so when there is a time difference, an error occurring when taking the target road environment image and the target local pose for the same target moment is negligible.

It should be noted that, when the target landmark information is the first landmark information, the target vehicle is the first vehicle, the target road environment image is the first road environment image, the target expanded navigation path is the first expanded navigation path, and the target local pose is a first local pose. When the target landmark information is the second landmark information, the target vehicle is the second vehicle, the target road environment image is the second road environment image, the target expanded navigation path is the second expanded navigation path, and the target local pose is a second local pose.

In the embodiment of the present application, not only can the target landmark information contained in the target road environment image at any moment be automatically perceived based on the pre-trained landmark perception model, but also the input data of the landmark perception model includes only the target road environment image and the target local pose and has nothing to do with the high precision map, thus the target landmark information can be obtained without the high precision map.

In an implementation, the landmark perception model may be a generative model or other neural network models. The embodiment of the present application does not limit the specific model algorithm used in the landmark perception model. A method for generating the landmark perception model includes: acquiring a landmark training sample set, where each training sample in the landmark training sample set includes: a road environment sample image group, a local pose corresponding to each frame of road environment sample image in the road environment sample image group, and a landmark truth value corresponding to each frame of road environment sample image; performing training by using the landmark training sample set to obtain the landmark perception model, where the landmark perception model is used to perceive and output landmark information in a road environment sample image.

The road environment sample image group includes multiple frames of continuous road environment sample images. In addition to a literal meaning of being continuous, "continuous" here can also include that a total number of frames of road environment sample images collected in a predetermined period of time exceeds a preset value.

According to the above solution, since the landmark perception model is trained based on multiple road environment sample image groups, in a process of machine learning, when performing landmark information perception on each frame of road environment sample image, adjacent frames (either one adjacent frame or multiple adjacent frames) before and after in the road environment sample image group will be referred to. Therefore, when performing landmark perception on a single frame of road environment image based on the landmark perception model, invisible landmark information in the road environment image can be perceived, including landmark information that is not contained or cannot be clearly displayed in the current image, such as landmark information outside a detection range of a sensor, landmark information that is blocked, landmark information that cannot be clearly displayed due to poor image quality (night, dazzling scenes, etc.), so as to achieve a perceptual effect of being invisible but obtainable. Moreover, the acquisition of the third local pose and the landmark truth value in the landmark training sample set do not rely on the high precision map, so that the distance prediction model that can perceive the landmark information in the road environment sample image can be automatically trained without frequently updating the high precision map.

In an implementation, the landmark truth value may be annotated manually or automatically. An automatic annotation method includes: for each road environment sample image group to be processed, acquiring drive-test time series data corresponding to the road environment sample image group according to a third local pose of each frame of road environment sample image in the road environment sample image group; building a first local map based on the drive-test time series data; acquiring the landmark truth value of each frame of road environment sample image by projecting the first local map separately into each frame of road environment sample image in the road environment sample image group.

The drive-test time series data includes vehicle travelling trajectories and road environment images collected during vehicle travelling. The drive-test time series data may be data recorded by a dashcam, data collected by a vehicle-mounted sensor, data recorded when the server interacts with the vehicle, or data recorded by other devices, as long as it is time series data that is real.

When acquiring the drive-test time series data corresponding to the road environment sample image group according to the third local pose of each frame of road environment sample image in the road environment sample image group, the third local pose of each frame of road environment sample image in the road environment sample image group can be acquired first, and then drive-test time series data containing these third local poses can be searched for. The drive-test time series data containing these third local poses are taken as the drive-test time series data corresponding to the road environment sample image group.

A method for acquiring the landmark truth value of the road environment sample image by projecting the first local map into the road environment sample image includes: converting the first local map from a map coordinate system to an image coordinate system, and taking landmark information of the first local map, which is converted to the image coordinate system, in the road environment sample image as the landmark truth value of the road environment sample image.

In the embodiment of the present application, the first local map can be built based on the drive-test time series data corresponding to the road environment sample image group, and the landmark truth value of each frame of road environment sample image can be obtained by projecting the first local map into the road environment sample image. In this way, the invisible landmark information in the road environment sample image can be automatically annotated on the premise of not relying on the high precision map, which provides a technical basis for the landmark perception model to have a technical effect of being invisible but obtainable.

After each iteration of training is performed based on the landmark training sample set and a landmark perception model obtained from this iteration of training is acquired, at least one road environment sample image group is processed based on the landmark perception model obtained from this iteration of training, to obtain a predicted landmark value of each frame of road environment sample image group, and a loss value is calculated based on a difference between the predicted landmark value and a corresponding landmark true value. When the loss value is greater than a first loss threshold, the iterative training is continued, and the training is not stopped until the loss value is less than or equal to the first loss threshold. The landmark perception model obtained from the final training is taken as the final required landmark perception model.

After the final landmark perception model is acquired by training, for each frame of road environment image collected by the second vehicle on the second expanded navigation path, this frame of road environment image and its corresponding third local pose can be input into the landmark perception model for processing, and the landmark information contained in this frame of road environment image which is output by the landmark perception model can be acquired.

In order to further improve the accuracy of the target landmark information and further enhance the perceptual effect of being invisible but obtainable, in the embodiment of the present application, after perceiving the target landmark information contained in a frame of target road environment image based on the landmark perception model, the target landmark information can also be used as input information of the landmark perception model when perceiving the next frame of road environment image. That is to say, in a case that the target moment is a moment when the target road environment image is collected for the Nth time on the target expanded navigation path, the input information of the landmark perception model can include not only the target road environment image at the target moment and the target local pose at the target moment, but also an output result of the landmark perception model for a previous moment adjacent to the target moment. The output result of the previous moment includes target landmark information contained in a target road environment image collected at the previous moment, so that the landmark perception model can also use the perception result of the previous frame as an intermediate value for reference when performing landmark perception on the current frame of road environment image, where N is a positive integer greater than or equal to 2.

Figure 5:
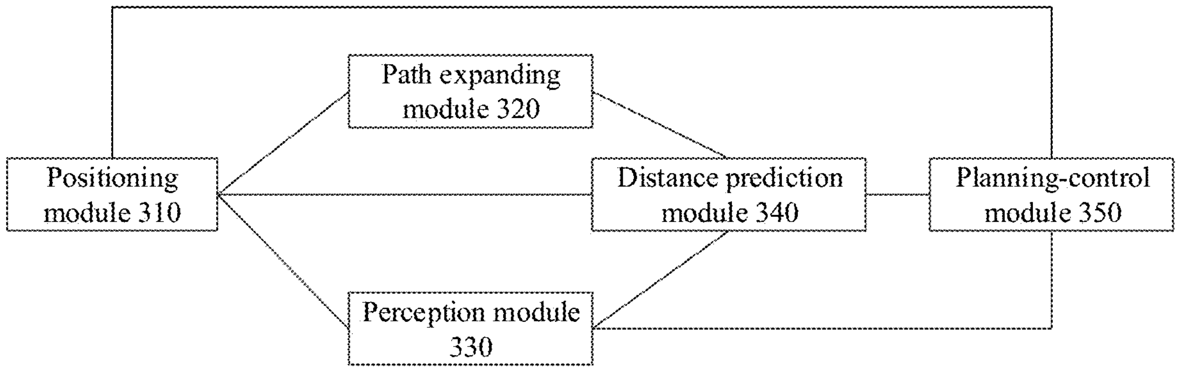
FIG. 5 is a structural diagram of a vehicle planning-control system provided by an embodiment of the present application.
Figure 6:
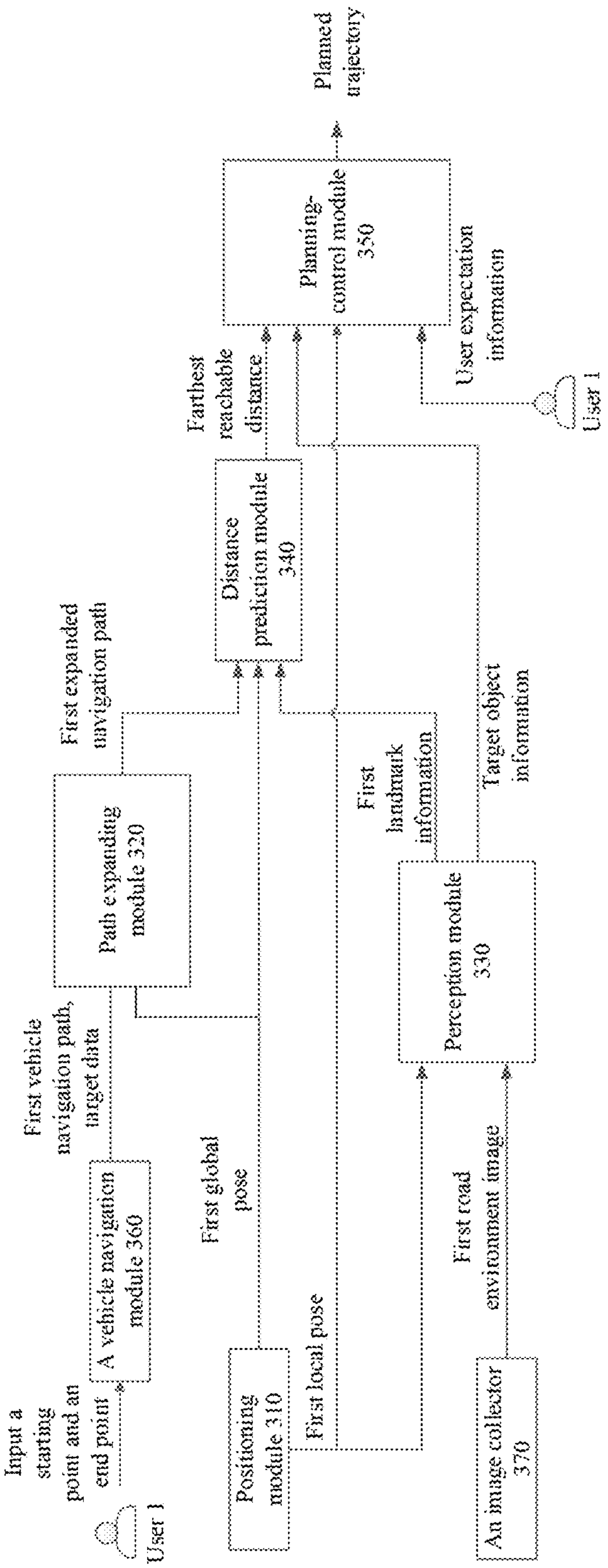
FIG. 6 is an example diagram of a vehicle planning-control system performing planning-control provided by an embodiment of the present application.

Based on the above method embodiments, another embodiment of the present application provides a vehicle planning-control system. As shown in FIG. 5 and FIG. 6, the system includes: a positioning module 310, a path expanding module 320, a perception module 330, a distance prediction module 340 and a planning-control module 350;

- the positioning module 310 is configured to acquire a first global pose and a first local pose of a first vehicle, where the first local pose includes an offset of a global pose of the first vehicle when collecting the first road environment image relative to a global pose at a target starting point;
- the path expanding module 320 is configured to determine a first expanded navigation path based on the first global pose, where the first expanded navigation path includes an expanded path of a first vehicle navigation path;
- the perception module 330 is configured to perceive first landmark information and target object information around the first vehicle, where the first landmark information includes landmark information included in the first road environment image collected by the first vehicle at the first global pose, and the target object information includes at least one of traffic light information in front of the first vehicle, static object information around the first vehicle, dynamic object information around the first vehicle;
- the distance prediction module 340 is configured to acquire a farthest reachable distance on each lane in the first landmark information based on the method described in any of the implementations of the embodiments of the distance prediction method;
- the planning-control module 350 is configured to determine a planned trajectory of the first vehicle according to user expectation information, the farthest reachable distance on each lane in the first landmark information, the first local pose and the target object information, and control the first vehicle to travel based on the planned trajectory.

According to the above solution, it can be seen that the planning-control system provided by the embodiment of the present application, which includes the positioning module, the path expanding module, the perception module, the distance prediction module and the planning-control module, can not only automatically predict the farthest reachable distance on each lane in the first landmark information by using the distance prediction model that does not rely on the high precision map and is automatically trained, but also determine a planned trajectory of the first vehicle according to the user expectation information, the farthest reachable distance on each lane in the first landmark information, the first local pose and the target object information, and control the first vehicle to travel based on the planned trajectory, so that the planning-control in intelligent driving can be realized under the condition of saving the economic cost and time cost. Moreover, a decoupling design is adopted for global positioning and local positioning, that is, when each module performs data processing, only one of positioning results of the global positioning and the local positioning is needed, and there is no impact on each other. In addition, the decline of the global positioning accuracy will not affect the local positioning, so results of real-time perception and planning-control will not be affected, and incorrect emergency braking will not be caused.

In a possible implementation, as shown in FIG. 6, the system also includes:

- a vehicle navigation module 360, configured to acquire starting and end points (i.e., a starting point and an end point) input by a user, and generate the first vehicle navigation path and target data according to the starting and end points. The starting point can be a default current position, that is, the first global pose at the current moment. In FIG. 6, user 1 is taken as an example.

In a possible implementation, the path expanding module 320 is configured to: acquire the first global pose and the first vehicle navigation path determined based on the first global pose; extract point of interest (POI) information corresponding to the first global pose from target data, where the target data includes navigation events and/or a vehicle navigation map, the POI information includes road attribute information related to predicting the farthest reachable distance, and the POI information corresponding to the first global pose includes POI information within a preset distance range in front of the first global pose on the first vehicle navigation path; add the POI information to the first vehicle navigation path to obtain the first expanded navigation path.

In a possible implementation, the perception module 330 is configured to: acquire input data of a landmark perception model, where the input data includes the first road environment image at a target moment and the first local pose at the target moment, and the target moment is any moment when the first vehicle collects the first road environment image on the first expanded navigation path; process the input data based on the landmark perception model to obtain the first landmark information included in the first road environment image at the target moment.

In a possible implementation, as shown in FIG. 6, the system also includes:

- an image collector 370, configured to acquire the first road environment image.

In a possible implementation, in a case that the target moment is a moment when the first road environment image is collected for the Nth time on the first expanded navigation path, the input data acquired by the perception module 330 also includes an output result of the landmark perception model for a previous moment adjacent to the target moment, where the output result of the previous moment includes the first landmark information included in a first road environment image collected at the previous moment, and N is a positive integer greater than or equal to 2.

Figure 7:
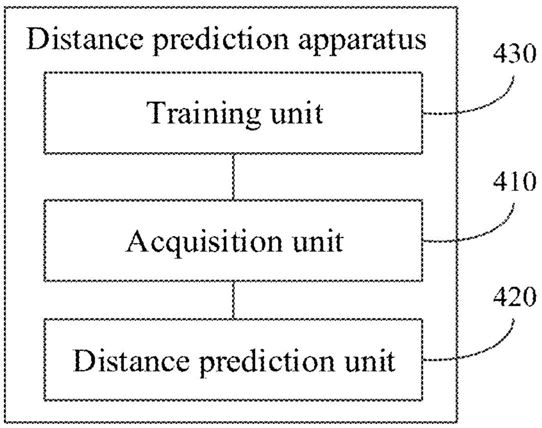
FIG. 7 is a component block diagram of a distance prediction apparatus provided by an embodiment of the present application.

Corresponding to the above method embodiments, another embodiment of the present application provides a distance prediction apparatus. As shown in FIG. 7, the apparatus includes:

an acquisition unit 410, configured to acquire a first global pose, a first expanded navigation path and first landmark information of a first vehicle, where the first global pose is a global pose of the first vehicle at a current moment, the first expanded navigation path includes an expanded path of a first vehicle navigation path determined based on the first global pose, and the first landmark information includes landmark information included in a first road environment image collected by the first vehicle at the first global pose;

a distance prediction unit 420, configured to process the first global pose, the first expanded navigation path and the first landmark information based on a distance prediction model to obtain a farthest reachable distance on each lane in the first landmark information;

the acquisition unit 410 is further configured to acquire a distance training sample set before the first global pose, the first expanded navigation path and the first landmark information are processed based on the distance prediction model, where each training sample in the distance training sample set includes: a second expanded navigation path, second landmark information, a second global pose and a truth value of a farthest reachable distance, where the second expanded navigation path includes an expanded path of a second vehicle navigation path, the second landmark information includes landmark information included in a second road environment image collected by a second vehicle on the second expanded navigation path, the second global pose includes a global pose of the second vehicle when collecting the second road environment image, and the truth value of the farthest reachable distance includes a truth value of a farthest reachable distance of each lane in the second landmark information;

the apparatus also includes:

a training unit 430, configured to perform training by using the distance training sample set to obtain the distance prediction model.

In a possible implementation, the acquisition unit 410 includes:

a first acquisition module, configured to acquire a target vehicle navigation path and a target global pose of a target vehicle travelling on the target vehicle navigation path in a case that a target expanded navigation path includes the first expanded navigation path and/or the second expanded navigation path, where, when the target expanded navigation path is the first expanded navigation path, the target vehicle navigation path is the first vehicle navigation path, the target vehicle is the first vehicle, and the target global pose is the first global pose; when the target expanded navigation path is the second expanded navigation path, the target vehicle navigation path is the second vehicle navigation path, and the target global pose is the second global pose;

an extraction module, configured to extract point of interest (POI) information corresponding to the target global pose from target data, where the target data includes navigation events and/or a vehicle navigation map, the POI information includes road attribute information related to predicting the farthest reachable distance, and the POI information corresponding to the target global pose includes POI information within a preset distance range in front of the target global pose on the target vehicle navigation path;

an adding module, configured to add the POI information to the target vehicle navigation path to obtain the target expanded navigation path.

In a possible implementation, the acquisition unit 410 includes:

a second acquisition module, configured to acquire input data of a landmark perception model in a case that target landmark information includes the first landmark information and/or the second landmark information, where the input data includes the target road environment image at a target moment and a target local pose at the target moment, where the target local pose includes an offset of a global pose of the target vehicle when collecting the target road environment image relative to a global pose at a target starting point, and the target moment is any moment when the target vehicle collects the target road environment image on a target expanded navigation path; when the target landmark information is the first landmark information, the target vehicle is the first vehicle, the target road environment image is the first road environment image, the target expanded navigation path is the first expanded navigation path, and the target local pose is a first local pose; when the target landmark information is the second landmark information, the target vehicle is the second vehicle, the target road environment image is the second road environment image, the target expanded navigation path is the second expanded navigation path, and the target local pose is a second local pose;

a processing module, configured to process the input data based on the landmark perception model to obtain the target landmark information included in the target road environment image at the target moment.

In a possible implementation, in a case that the target moment is a moment when the target road environment image is collected for the Nth time on the target expanded navigation path, the input data also includes an output result of the landmark perception model for a previous moment adjacent to the target moment, where the output result of the previous moment includes target landmark information included in a target road environment image collected at the previous moment, and N is a positive integer greater than or equal to 2.

In a possible implementation, the acquisition unit 410 also includes:

a first generation module, configured to generate the landmark perception model before the processing module processes the input data based on the landmark perception model to obtain the target landmark information included in the target road environment image at the target moment;

where the first generation module includes:

an acquisition submodule, configured to acquire a landmark training sample set, where each training sample in the landmark training sample set includes: a road environment sample image group, a third local pose corresponding to each frame of road environment sample image in the road environment sample image group, and a landmark truth value corresponding to each frame of road environment sample image, where the road environment sample image group includes multiple frames of continuous road environment sample images;

a training submodule, configured to perform training by using the landmark training sample set to obtain the landmark perception model, where the landmark perception model is used to perceive and output landmark information in a road environment sample image.

In a possible implementation, the acquisition submodule is configured to: for each road environment sample image group to be processed, acquire drive-test time series data corresponding to the road environment sample image group according to the third local pose of each frame of road environment sample image in the road environment sample image group; build a first local map based on the drive-test time series data; acquire the landmark truth value of each frame of road environment sample image by projecting the first local map separately into each frame of road environment sample image in the road environment sample image group.

In a possible implementation, the acquisition unit 410 includes:

- a second generation module, configured to generate a second local map including the second expanded navigation path based on a continuous video stream;
- a travelling module, configured to travel according to the second expanded navigation path in the second local map;
- a calculating module, configured to calculate the farthest reachable distance on each lane ahead of each second global pose on the second expanded navigation path separately based on the second local map;
- a truth value annotation module, configured to take a calculated farthest reachable distance as a truth value, and annotate corresponding second landmark information with the truth value to obtain the truth value of the farthest reachable distance of each lane in the second landmark information.

Using the distance prediction apparatus provided by the embodiment of the present application, the distance prediction model can be obtained at first by training according to the distance training sample set including the second expanded navigation path, the second landmark information, the second global pose and the true value of the farthest reachable distance of each lane in the second landmark information. Then the first global pose, the first expanded navigation path and the first landmark information are input into the distance prediction model, and the farthest reachable distance on each lane in the first landmark information is predicted. Since the second global pose, the second expanded navigation path and the second landmark information required in model training, as well as the first global pose, the first expanded navigation path and the first landmark information required in model application, do not rely on the high precision map, in the embodiment of the present application, the distance prediction model that can predict the furthest reachable distance of the vehicle on each lane ahead of the vehicle can be automatically trained without frequently updating the high precision map, and the distance prediction model can be used to automatically predict the furthest reachable distance of the vehicle on each lane ahead of the vehicle, so as to quickly perform path planning according to the furthest reachable distance of the vehicle on each lane ahead of the vehicle. In this way, the planning-control in intelligent driving can be realized under the condition of saving the economic cost and time cost.

Figure 8:
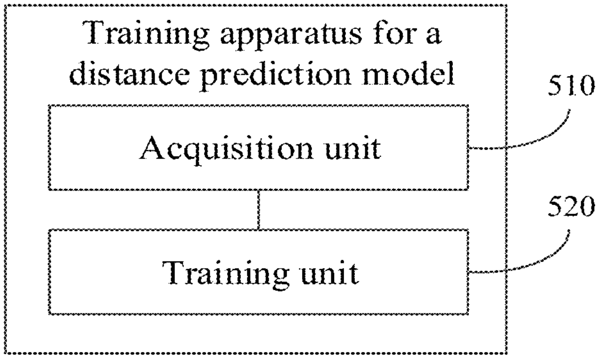
FIG. 8 is a component block diagram of a training apparatus for a distance prediction model provided by an embodiment of the present application.

Corresponding to the above method embodiments, another embodiment of the present application provides a training apparatus for a distance prediction model. As shown in FIG. 8, the apparatus includes:

- an acquisition unit 510, configured to acquire a distance training sample set, where each training sample in the distance training sample set includes: a second expanded navigation path, second landmark information, a second global pose and a truth value of a farthest reachable distance, where the second expanded navigation path includes an expanded path of a second vehicle navigation path, the second landmark information includes landmark information included in a second road environment image collected by a second vehicle on the second expanded navigation path, and the second global pose includes a global pose of the second vehicle when collecting the second road environment image;
- a training unit 520, configured to perform training by using the distance training sample set to obtain the distance prediction model, where the distance prediction model is used to predict a farthest reachable distance of any vehicle on each lane ahead of the vehicle.

In a possible implementation, the acquisition unit 510 includes:

- a first acquisition module, configured to acquire the second vehicle navigation path and the second global pose of the second vehicle when travelling on the second vehicle navigation path;
- an extraction module, configured to extract point of interest (POI) information corresponding to the second global pose from target data, where the target data includes navigation events and/or a vehicle navigation map, the POI information includes road attribute information related to predicting the farthest reachable distance, and the POI information corresponding to the second global pose includes POI information within a preset distance range in front of the second global pose on the second vehicle navigation path;
- an adding module, configured to add the POI information to the second vehicle navigation path to obtain the second expanded navigation path.

In a possible implementation, the acquisition unit 510 includes:

- a second acquisition module, configured to acquire input data of a landmark perception model, where the input data includes the second road environment image at a target moment and a second local pose at the target moment, where the second local pose includes an offset of a global pose of the second vehicle when collecting the second road environment image relative to a global pose at a target starting point, and the target moment is any moment when the second vehicle collects the second road environment image on the second expanded navigation path;
- a processing module, configured to process the input data based on the landmark perception model to obtain the second landmark information included in the second road environment image at the target moment.

In a possible implementation, in a case that the target moment is a moment when the second road environment image is collected for the Nth time on the second expanded navigation path, the input data also includes an output result of the landmark perception model for a previous moment adjacent to the target moment, where the output result of the previous moment includes second landmark information included in a second road environment image collected at the previous moment, and N is a positive integer greater than or equal to 2.

In a possible implementation, the acquisition unit 510 also includes:

- a first generation module, configured to generate the landmark perception model before the input data is processed based on the landmark perception model to obtain the second landmark information included in the second road environment image at the target moment;

the first generation module includes:

an acquisition submodule, configured to acquire a landmark training sample set, where each training sample in the landmark training sample set includes: a road environment sample image group, a third local pose corresponding to each frame of road environment sample image in the road environment sample image group, and a landmark truth value corresponding to each frame of road environment sample image, where the road environment sample image group includes multiple frames of continuous road environment sample images;

a training submodule, configured to perform training by using the landmark training sample set to obtain the landmark perception model, where the landmark perception model is used to perceive and output landmark information in a road environment sample image.

In a possible implementation, the acquisition submodule is configured to: for each road environment sample image group to be processed, acquire drive-test time series data corresponding to the road environment sample image group according to the third local pose of each frame of road environment sample image in the road environment sample image group; build a first local map based on the drive-test time series data; acquire the landmark truth value of each frame of road environment sample image by projecting the first local map separately into each frame of road environment sample image in the road environment sample image group.

In a possible implementation, the acquisition unit 510 includes:

a second generation module, configured to generate a second local map including the second expanded navigation path based on a continuous video stream;

a travelling module, configured to travel according to the second expanded navigation path in the second local map;

a calculating module, configured to calculate the farthest reachable distance on each lane ahead of each second global pose on the second expanded navigation path separately based on the second local map;

a truth value annotation module, configured to take a calculated farthest reachable distance as a truth value, and annotate corresponding second landmark information with the truth value to obtain the truth value of the farthest reachable distance of each lane in the second landmark information.

Using the training apparatus for the distance prediction model provided in the embodiment of the present application, the distance prediction model can be obtained by training according to the distance training sample set including the second expanded navigation path, the second landmark information, the second global pose and the true value of the farthest reachable distance of each lane in the second landmark information. Obviously, the acquisition of these sample information does not rely on the high precision map. In this way, the distance prediction model that can predict the furthest reachable distance of the vehicle on each lane ahead of the vehicle can be automatically trained without frequently updating the high precision map, and the distance prediction model can be used to automatically predict the furthest reachable distance of the vehicle on each lane ahead of the vehicle, so as to quickly perform path planning according to the furthest reachable distance of the vehicle on each lane ahead of the vehicle. In this way, the planning-control in intelligent driving can be realized under the condition of saving the economic cost and time cost.

Based on the above method embodiments, another embodiment of the present application provides a computer readable storage medium on which a computer program is stored, and when the program is executed by a processor, the method described in any of the above implementations is implemented.

Figure 9:
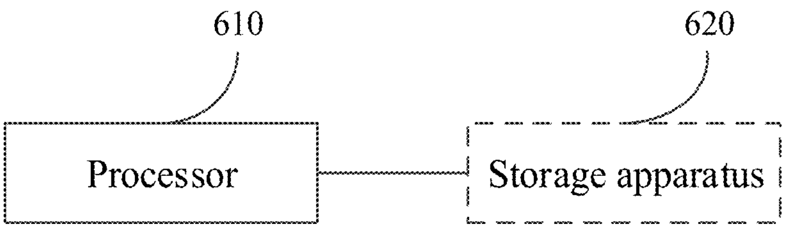
FIG. 9 is a schematic structural diagram of an electronic device or a computer device provided by an embodiment of the present application.

Based on the above method embodiments, another embodiment of the present application provides an electronic device or a computer device which, as shown in FIG. 9, includes:

one or more processors 610;

the processors 610 are coupled with a storage apparatus 620, and the storage apparatus 620 is used for storing one or more programs;

when the one or more programs are executed by the one or more processors 610, the electronic device or the computer device is caused to implement the method described in any of the above implementations.

Based on the above method embodiments, another embodiment of the present application provides a vehicle, where the vehicle includes the system described in any of the above implementations, or the apparatus described in any of the above implementations, or the electronic device described above.

The vehicle includes a CPU (Central Processing Unit, Central Processing Unit), a T-Box (Telematics Box, Telematics Box), an image collector, and a navigation positioning apparatus. Among them, the image collector is used to collect a road environment image; the navigation positioning apparatus is used to position the vehicle and acquire a global pose and a local pose of the vehicle; the CPU is used to acquire the road environment image, the global pose and the local pose, acquire a distance prediction module through the above embodiments of the training method for the distance prediction model, and predict the farthest reachable distance on each lane in the current landmark information through the above embodiments of the distance prediction method. The CPU can also send the road environment image, the global pose and the local pose to a server through the T-Box, and the server acquires the distance prediction module through the above embodiments of the training method for the distance prediction model, and predicts the farthest reachable distance on each lane in the current landmark information through the above embodiments of the distance prediction method.

Based on the above embodiments, another embodiment of the present application provides a computer program product, where the computer program product contains instructions, and when the instructions run on a computer or processor, the computer or processor is caused to execute the method described in any of the above implementations.

The apparatus embodiments correspond to the method embodiments and have the same technical effects as the method embodiments. For details, please refer to the method embodiments. The apparatus embodiments are acquired based on method embodiments, and for the specific description, the part of the method embodiments can be referred to, which will not be repeated here. It may be understood by persons of ordinary skill in the art that an accompanying drawing is only a schematic diagram of an embodiment, and that the modules or processes in the accompanying drawing are not necessarily necessary for the implementation of the present application.

It may be understood by persons of ordinary skill in the art that the modules in the apparatus of the embodiments may be distributed in the apparatus of the embodiments as described in the embodiments, or may be modified accordingly and located in one or more apparatuses different from the embodiments. The modules of the above embodiments may be combined into a single module or further divided into multiple submodules.

Finally, it should be noted that the above embodiments are used only to illustrate the technical solutions of the present application, and not to limit them. Although the present application has been described in detail with reference to the foregoing embodiments, it should be understood by persons of ordinary skill in the art that they may modify the technical solutions described in the foregoing embodiments or make equivalent substitutions for some of the technical features, and such modifications or replacements shall not make the essence of the relevant technical solutions deviate from the spirit and scope of the technical solutions of the embodiments of the present application.

What is claimed is:

1. A distance prediction method, wherein the method comprises:

acquiring a first global pose, a first expanded navigation path and first landmark information of a first vehicle, wherein the first global pose is a global pose of the first vehicle at a current moment, the first expanded navigation path comprises an expanded path of a first vehicle navigation path determined based on the first global pose, and the first landmark information comprises landmark information comprised in a first road environment image collected by the first vehicle at the first global pose;

processing the first global pose, the first expanded navigation path and the first landmark information based on a distance prediction model to obtain a farthest reachable distance on each lane in the first landmark information;

wherein the distance prediction model is obtained in the following ways:

acquiring a distance training sample set, wherein each training sample in the distance training sample set comprises: a second expanded navigation path, second landmark information, a second global pose and a truth value of a farthest reachable distance, wherein the second expanded navigation path comprises an expanded path of a second vehicle navigation path, the second landmark information comprises landmark information comprised in a second road environment image collected by a second vehicle on the second expanded navigation path, the second global pose comprises a global pose of the second vehicle when collecting the second road environment image, and the truth value of the farthest reachable distance comprises a truth value of a farthest reachable distance of each lane in the second landmark information;

performing training by using the distance training sample set to obtain the distance prediction model;

wherein in a case that target landmark information comprises the first landmark information and/or the second landmark information, acquiring the target landmark information comprised in a target road environment image collected by a target vehicle at a target moment comprises:

acquiring input data of a landmark perception model, wherein the input data comprises the target road environment image at the target moment and a target local pose at the target moment, wherein the target local pose comprises an offset of a global pose of the target vehicle when collecting the target road environment image relative to a global pose at a target starting point, and the target moment is any moment when the target vehicle collects the target road environment image on a target expanded navigation path; when the target landmark information is the first landmark information, the target vehicle is the first vehicle, the target road environment image is the first road environment image, the target expanded navigation path is the first expanded navigation path, and the target local pose is a first local pose; when the target landmark information is the second landmark information, the target vehicle is the second vehicle, the target road environment image is the second road environment image, the target expanded navigation path is the second expanded navigation path, and the target local pose is a second local pose;

processing the input data based on the landmark perception model to obtain the target landmark information comprised in the target road environment image at the target moment.

2. The method according to claim 1, wherein in a case that a target expanded navigation path comprises the first expanded navigation path and/or the second expanded navigation path, acquiring the target expanded navigation path comprises:

acquiring a target vehicle navigation path and a target global pose of a target vehicle travelling on the target vehicle navigation path, wherein, when the target expanded navigation path is the first expanded navigation path, the target vehicle navigation path is the first vehicle navigation path, the target vehicle is the first vehicle, and the target global pose is the first global pose; when the target expanded navigation path is the second expanded navigation path, the target vehicle navigation path is the second vehicle navigation path, and the target global pose is the second global pose;

extracting point of interest (POI) information corresponding to the target global pose from target data, wherein the target data comprises navigation events and/or a vehicle navigation map, the POI information comprises road attribute information related to predicting the farthest reachable distance, and the POI information corresponding to the target global pose comprises POI information within a preset distance range in front of the target global pose on the target vehicle navigation path;

adding the POI information to the target vehicle navigation path to obtain the target expanded navigation path.

3. The method according to claim 1, wherein in a case that the target moment is a moment when the target road environment image is collected for an Nth time on the target expanded navigation path, the input data further comprises an output result of the landmark perception model for a previous moment adjacent to the target moment, wherein the output result of the previous moment comprises target landmark information comprised in a target road environment image collected at the previous moment, and N is a positive integer greater than or equal to 2.

4. The method according to claim 1, wherein generating the landmark perception model comprises:

acquiring a landmark training sample set, wherein each training sample in the landmark training sample set comprises: a road environment sample image group, a third local pose corresponding to each frame of road environment sample image in the road environment sample image group, and a landmark truth value corresponding to each frame of road environment sample image, wherein the road environment sample image group comprises multiple frames of continuous road environment sample images;

performing training by using the landmark training sample set to obtain the landmark perception model, wherein the landmark perception model is used to perceive and output landmark information in a road environment sample image.

5. The method according to claim 4, wherein acquiring the landmark truth value comprises:

for each road environment sample image group to be processed, acquiring drive-test time series data corresponding to the road environment sample image group according to the third local pose of each frame of road environment sample image in the road environment sample image group;

building a first local map based on the drive-test time series data;

acquiring the landmark truth value of each frame of road environment sample image by projecting the first local map separately into each frame of road environment sample image in the road environment sample image group.

6. The method according to claim 1, wherein acquiring the truth value of the farthest reachable distance comprises:

generating a second local map comprising the second expanded navigation path based on a continuous video stream, and travelling according to the second expanded navigation path in the second local map;

calculating the farthest reachable distance on each lane ahead of each second global pose on the second expanded navigation path separately based on the second local map;

taking a calculated farthest reachable distance as a truth value, and annotating corresponding second landmark information with the truth value to obtain the truth value of the farthest reachable distance of each lane in the second landmark information.

7. A vehicle planning-control system, wherein the system comprises:

one or more processors;

the processors are coupled with a storage apparatus, the storage apparatus is used for storing one or more programs;

when the one or more programs are executed by the one or more processors, the vehicle planning-control system is caused to:

acquire a first global pose and a first local pose of a first vehicle, wherein the first local pose comprises an offset of a global pose of the first vehicle when collecting a first road environment image relative to a global pose at a target starting point;

determine a first expanded navigation path based on the first global pose, wherein the first expanded navigation path comprises an expanded path of a first vehicle navigation path;

perceive first landmark information and target object information around the first vehicle, wherein the first landmark information comprises landmark information comprised in the first road environment image collected by the first vehicle at the first global pose, and the target object information comprises at least one of traffic light information in front of the first vehicle, static object information around the first vehicle, dynamic object information around the first vehicle;

acquire a farthest reachable distance on each lane in the first landmark information based on the method according to claim 1;

determine a planned trajectory of the first vehicle according to user expectation information, the farthest reachable distance on each lane in the first landmark information, the first local pose and the target object information, and control the first vehicle to travel based on the planned trajectory.

8. A vehicle, wherein the vehicle comprises the system according to claim 7.

9. A non-transitory computer-readable storage medium on which a computer program is stored, wherein when the program is executed by a processor, the method according to claim 1 is implemented.

10. The method according to claim 1, wherein the method further comprises:

generating a planned trajectory and a control instruction to control the first vehicle to change lanes, accelerate, decelerate or brake.

11. A distance prediction apparatus, wherein the apparatus comprises:

one or more processors;

the processors are coupled with a storage apparatus, the storage apparatus is used for storing one or more programs;

when the one or more programs are executed by the one or more processors, the distance prediction apparatus is caused to:

acquire a first global pose, a first expanded navigation path and first landmark information of a first vehicle, wherein the first global pose is a global pose of the first vehicle at a current moment, the first expanded navigation path comprises an expanded path of a first vehicle navigation path determined based on the first global pose, and the first landmark information comprises landmark information comprised in a first road environment image collected by the first vehicle at the first global pose;

process the first global pose, the first expanded navigation path and the first landmark information based on a distance prediction model to obtain a farthest reachable distance on each lane in the first landmark information;

acquire a distance training sample set before the first global pose, the first expanded navigation path and the first landmark information are processed based on the distance prediction model, wherein each training sample in the distance training sample set comprises: a second expanded navigation path, second landmark information, a second global pose and a truth value of a farthest reachable distance, wherein the second expanded navigation path comprises an expanded path of a second vehicle navigation path, the second landmark information comprises landmark information comprised in a second road environment image collected by a second vehicle on the second expanded navigation path, the second global pose comprises a global pose of the second vehicle when collecting the second road environment image, and the truth value of the farthest reachable distance comprises a truth value of a farthest reachable distance of each lane in the second landmark information;

perform training by using the distance training sample set to obtain the distance prediction model;

wherein the distance prediction apparatus is further caused to:

acquire input data of a landmark perception model in a case that target landmark information comprises the first landmark information and/or the second landmark information, wherein the input data comprises the target road environment image at the target moment and a target local pose at the target moment, wherein the target local pose comprises an offset of a global pose of the target vehicle when collecting the target road environment image relative to a global pose at a target starting point, and the target moment is any moment when the target vehicle collects the target road environment image on a target expanded navigation path; when the target landmark information is the first landmark information, the target vehicle is the first vehicle, the target road environment image is the first road environment image, the target expanded navigation path is the first expanded navigation path, and the target local pose is a first local pose; when the target landmark information is the second landmark information, the target vehicle is the second vehicle, the target road environment image is the second road environment image, the target expanded navigation path is the second expanded navigation path, and the target local pose is a second local pose;

process the input data based on the landmark perception model to obtain the target landmark information comprised in the target road environment image at the target moment.

12. The apparatus according to claim 11, wherein the distance prediction apparatus is further caused to:

acquire a target vehicle navigation path and a target global pose of a target vehicle travelling on the target vehicle navigation path in a case that a target expanded navigation path comprises the first expanded navigation path and/or the second expanded navigation path, wherein, when the target expanded navigation path is the first expanded navigation path, the target vehicle navigation path is the first vehicle navigation path, the target vehicle is the first vehicle, and the target global pose is the first global pose; when the target expanded navigation path is the second expanded navigation path, the target vehicle navigation path is the second vehicle navigation path, and the target global pose is the second global pose;

extract point of interest (POI) information corresponding to the target global pose from target data, wherein the target data comprises navigation events and/or a vehicle navigation map, the POI information comprises road attribute information related to predicting the farthest reachable distance, and the POI information corresponding to the target global pose comprises POI information within a preset distance range in front of the target global pose on the target vehicle navigation path;

add the POI information to the target vehicle navigation path to obtain the target expanded navigation path.

13. The apparatus according to claim 11, wherein in a case that the target moment is a moment when the target road environment image is collected for an Nth time on the target expanded navigation path, the input data further comprises an output result of the landmark perception model for a previous moment adjacent to the target moment, wherein the output result of the previous moment comprises target landmark information comprised in a target road environment image collected at the previous moment, and N is a positive integer greater than or equal to 2.

14. The apparatus according to claim 11, wherein the distance prediction apparatus is further caused to:

generate the landmark perception model before processing the input data based on the landmark perception model to obtain the target landmark information comprised in the target road environment image at the target moment;

wherein the distance prediction apparatus is specifically caused to:

acquire a landmark training sample set, wherein each training sample in the landmark training sample set comprises: a road environment sample image group, a third local pose corresponding to each frame of road environment sample image in the road environment sample image group, and a landmark truth value corresponding to each frame of road environment sample image, wherein the road environment sample image group comprises multiple frames of continuous road environment sample images;

perform training by using the landmark training sample set to obtain the landmark perception model, wherein the landmark perception model is used to perceive and output landmark information in a road environment sample image.

15. The apparatus according to claim 14, wherein the distance prediction apparatus is further caused to: for each road environment sample image group to be processed, acquire drive-test time series data corresponding to the road environment sample image group according to the third local pose of each frame of road environment sample image in the road environment sample image group; build a first local map based on the drive-test time series data; acquire the landmark truth value of each frame of road environment sample image by projecting the first local map separately into each frame of road environment sample image in the road environment sample image group.

16. The apparatus according to claim 11, wherein the distance prediction apparatus is further caused to:

generate a second local map comprising the second expanded navigation path based on a continuous video stream;

travel according to the second expanded navigation path in the second local map;

calculate the farthest reachable distance on each lane ahead of each second global pose on the second expanded navigation path separately based on the second local map;

take a calculated farthest reachable distance as a truth value, and annotate corresponding second landmark information with the truth value to obtain the truth value of the farthest reachable distance of each lane in the second landmark information.

17. A vehicle, wherein the vehicle comprises the apparatus according to claim 11.

* * * * *